(No Model.)
9 Sheets—Sheet 5.
C. S. ELLIS.
TYPE WRITING MACHINE.
No. 559,127.
Patented Apr. 28, 1896.

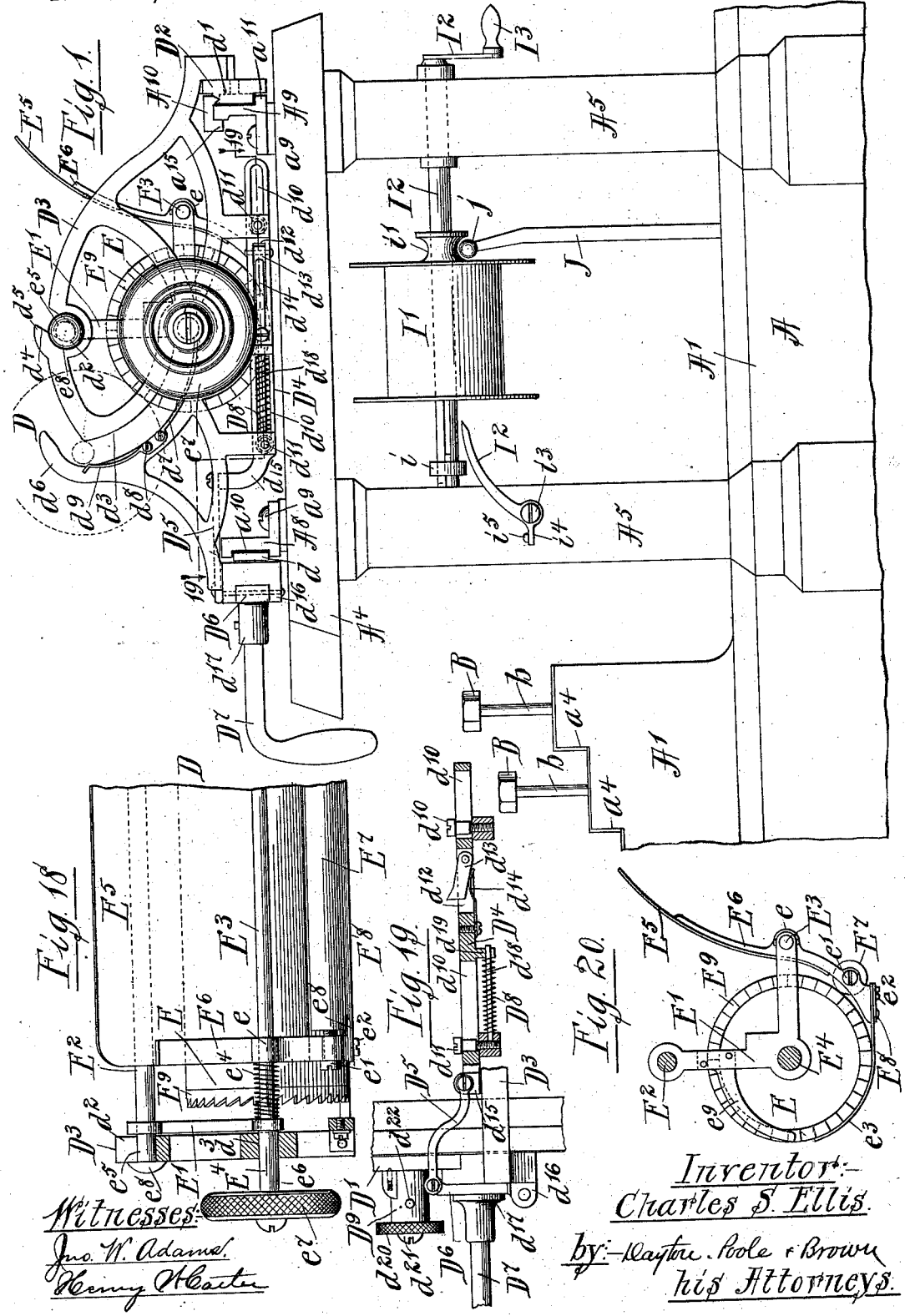

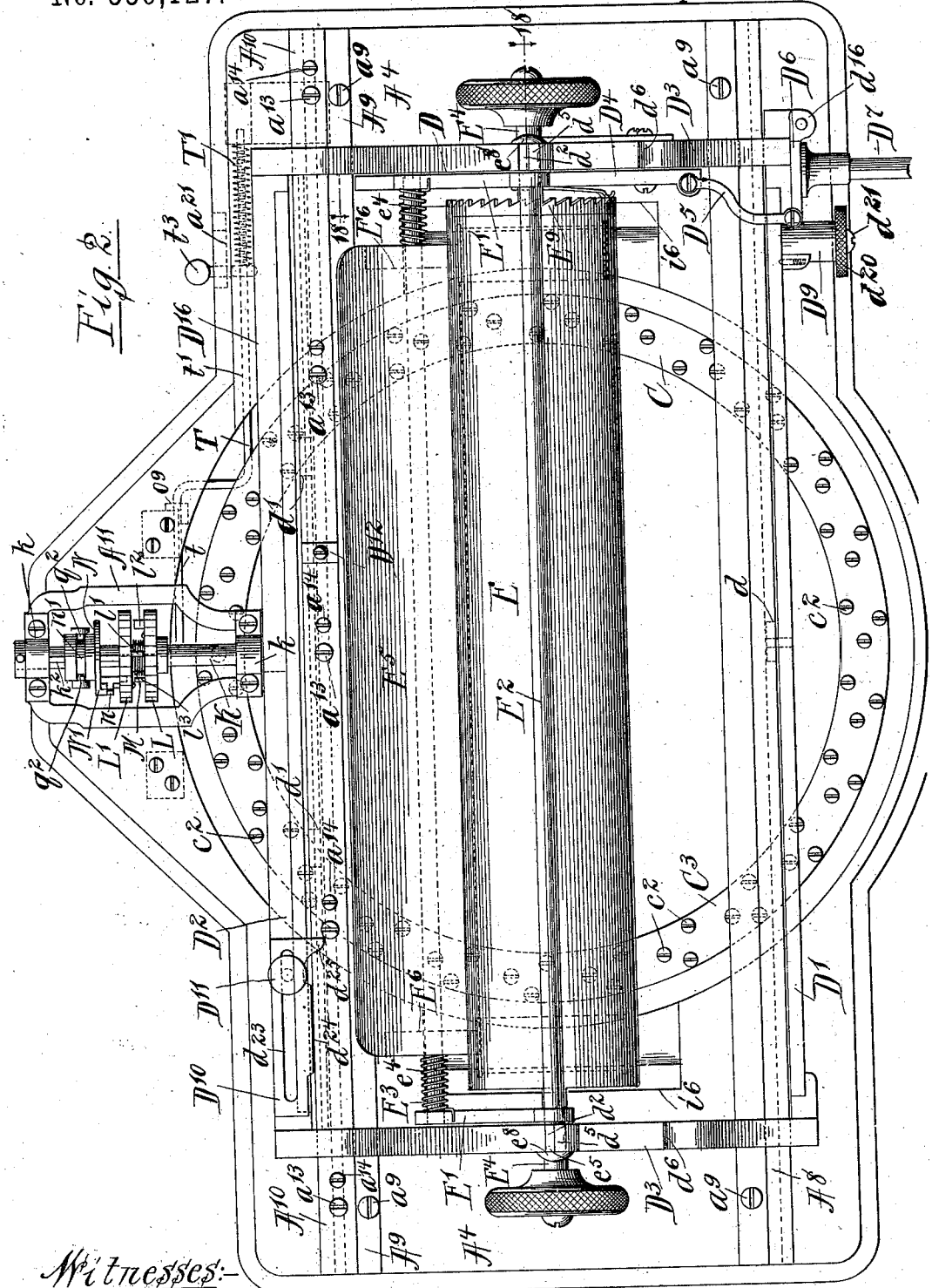

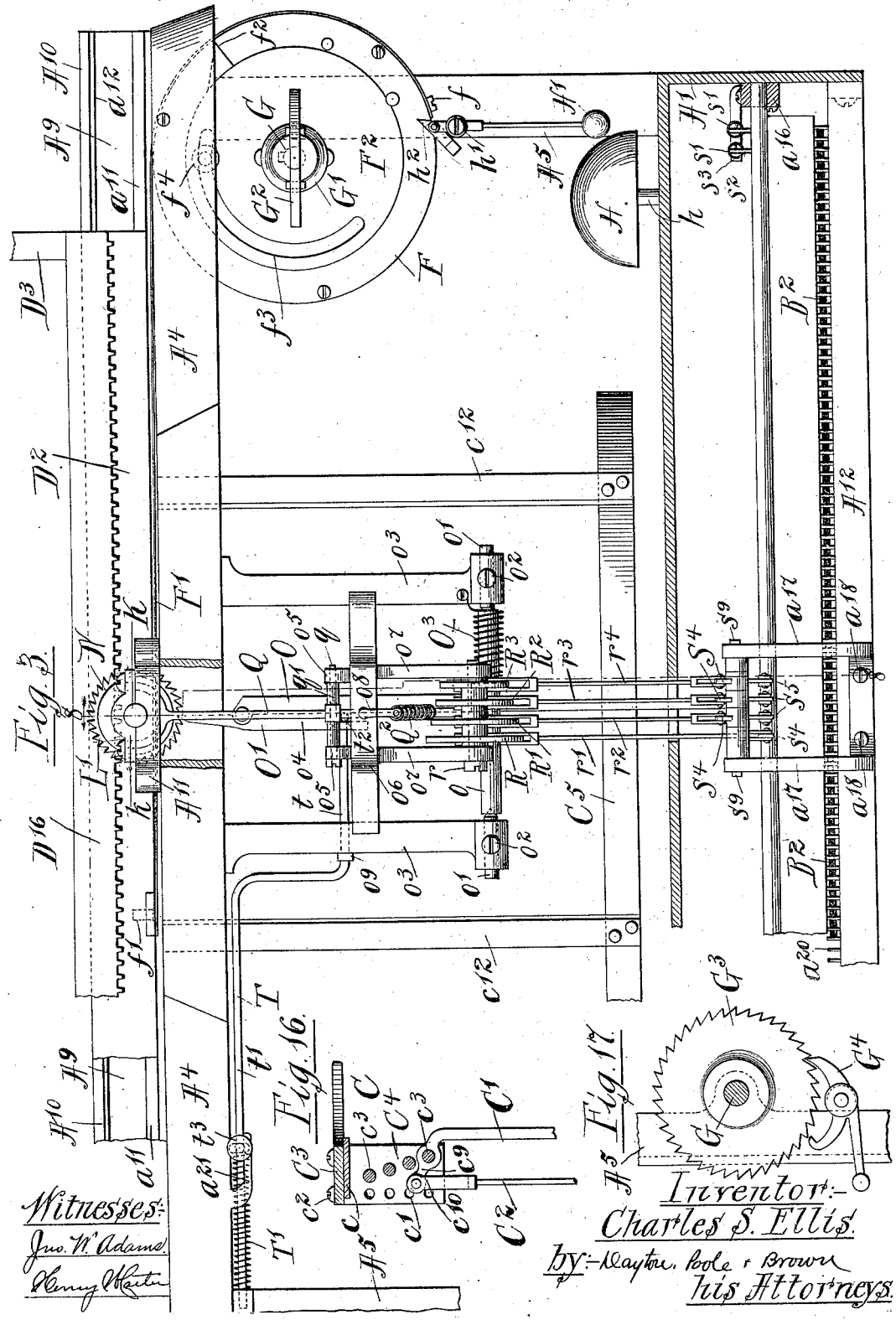

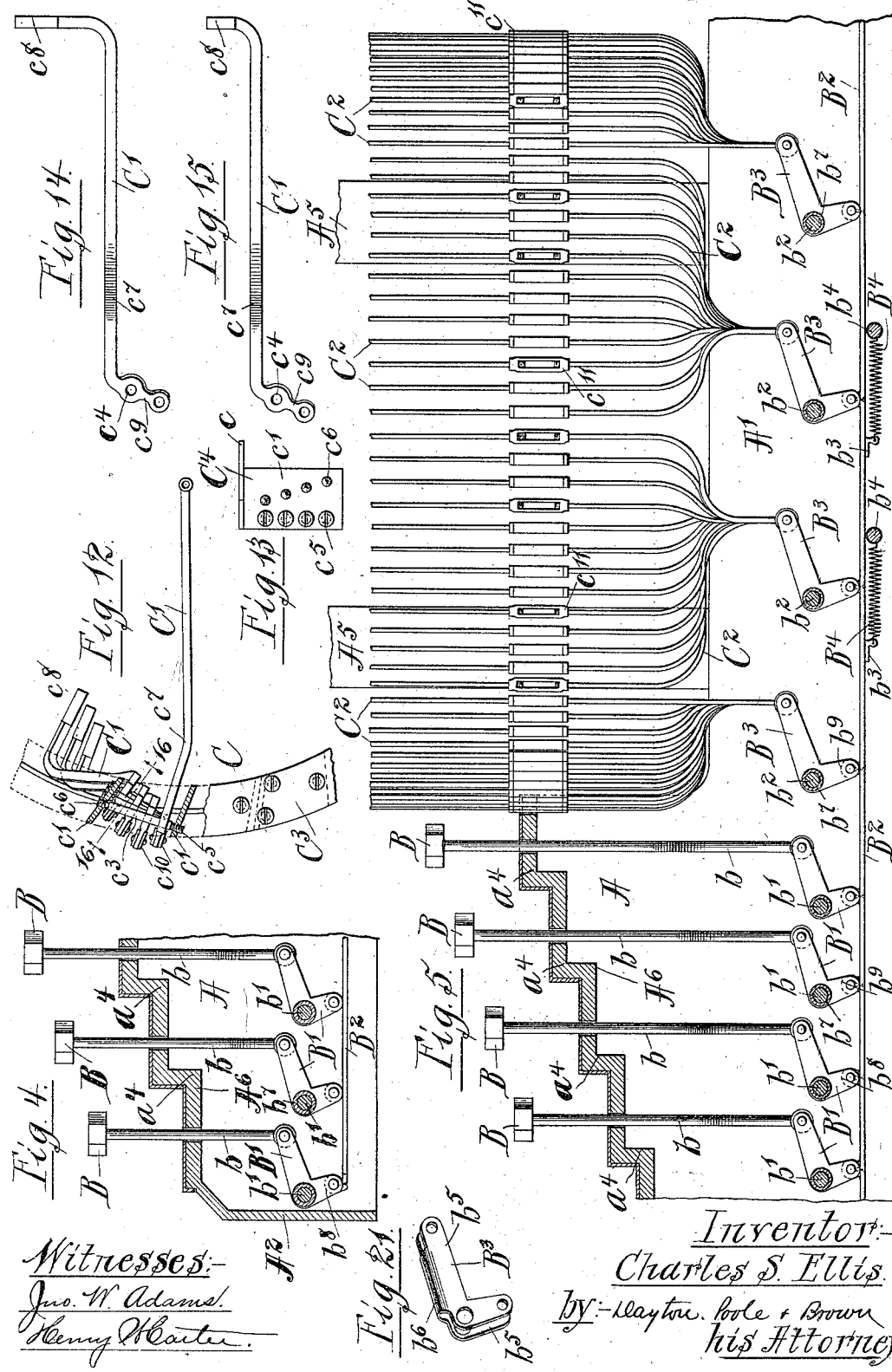

Witnesses:
Jno. W. Adams.
Henry H. Carter.

Inventor:-
Charles S. Ellis
by:— Dayton, Poole & Brown his Att'ys

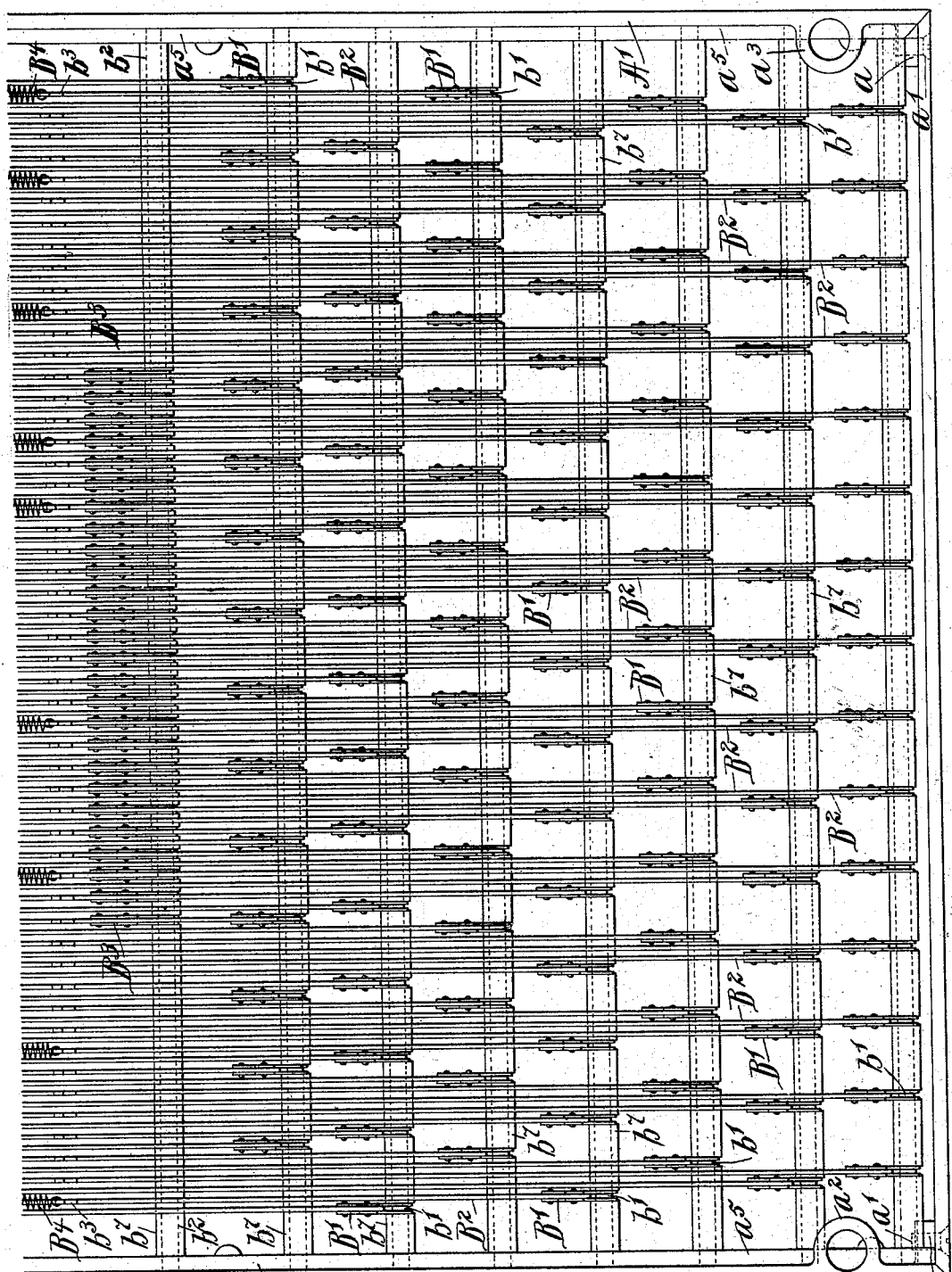

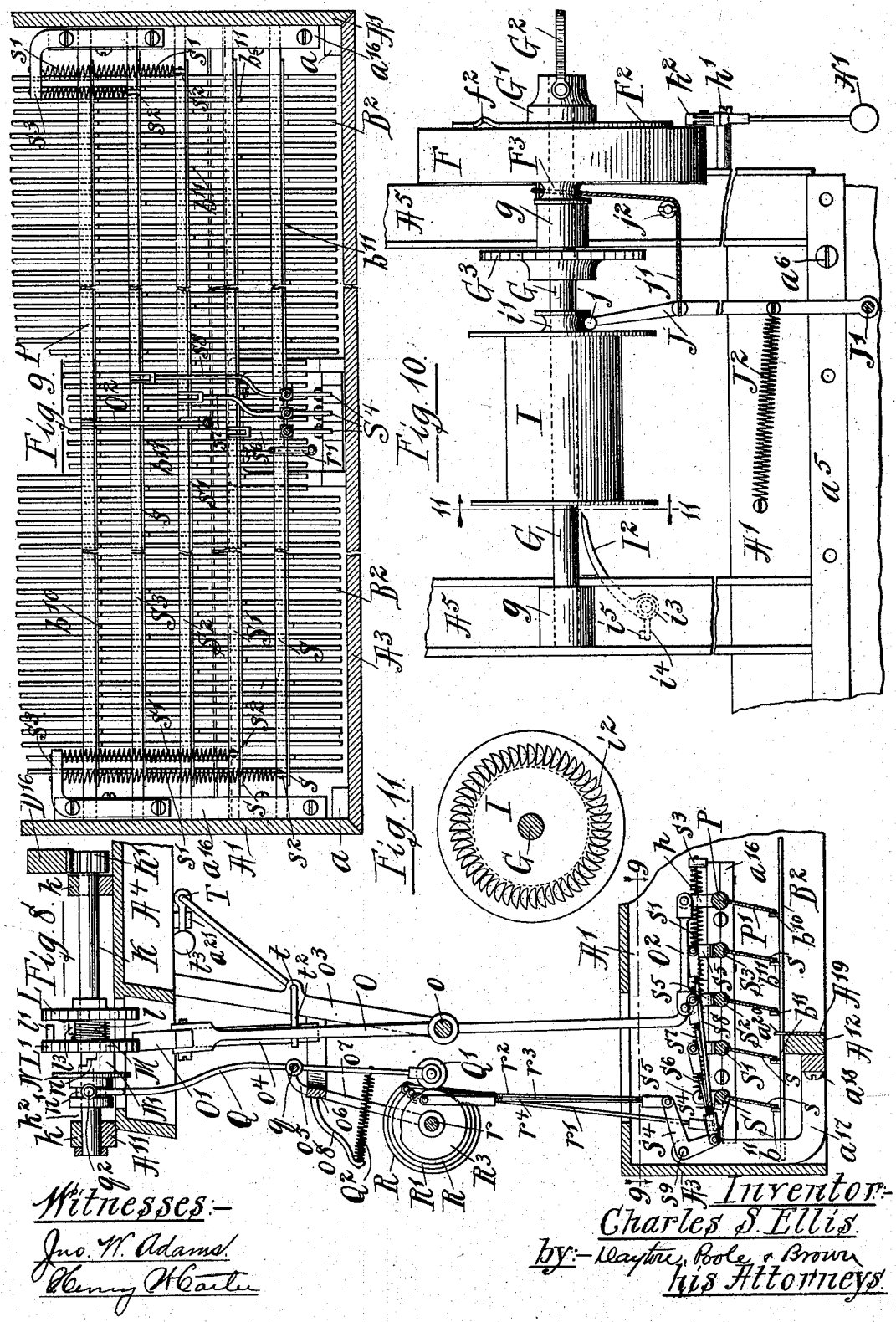

(No Model.) 9 Sheets—Sheet 8.
C. S. ELLIS.
TYPE WRITING MACHINE.
No. 559,127. Patented Apr. 28, 1896.
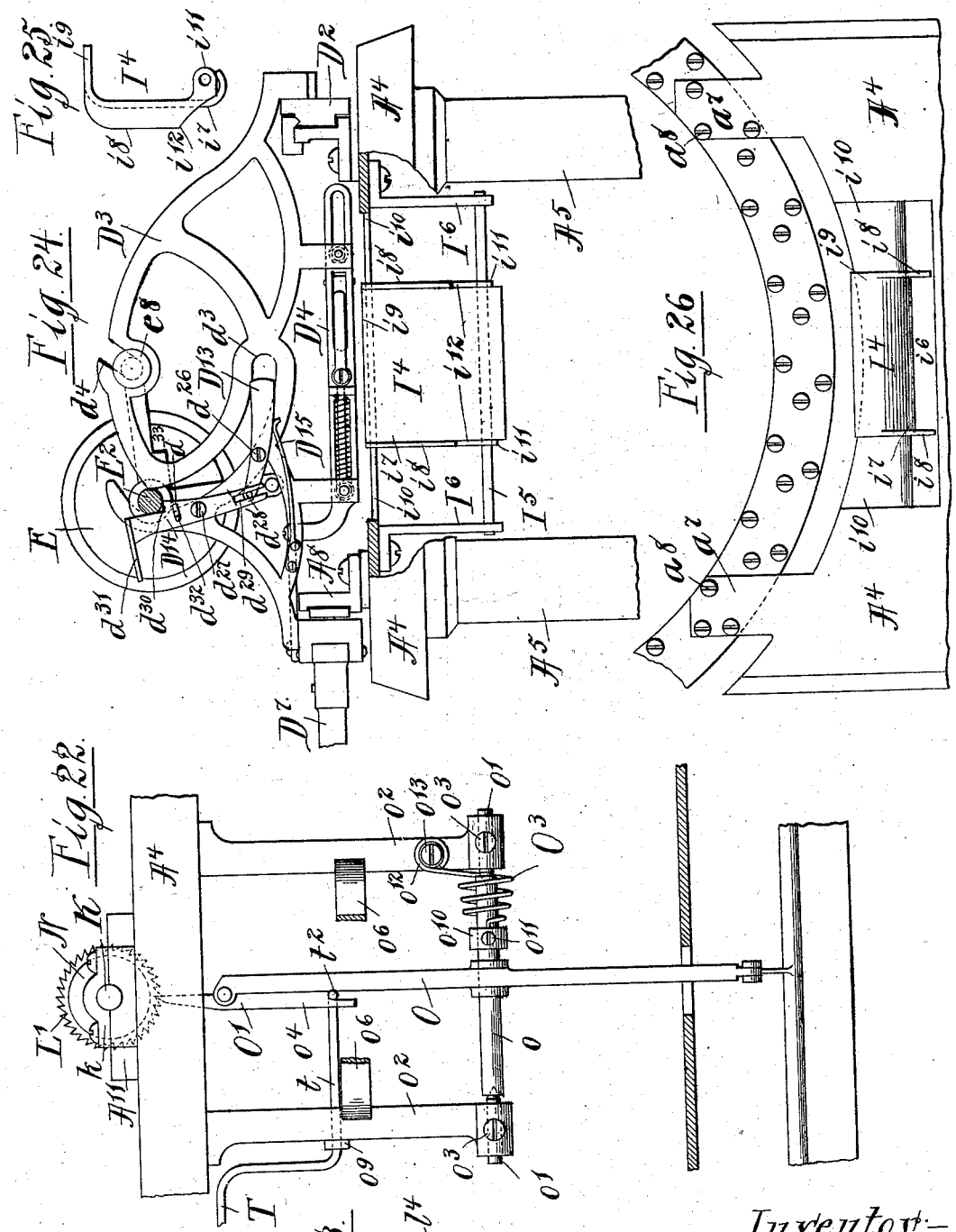
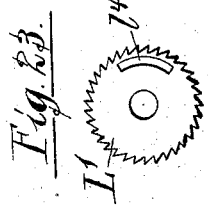
Witnesses:—
Jno. W. Adams
Henry W. Carter
Inventor:—
Charles S. Ellis
by:— Dayton, Poole & Brown
his Attorneys (No Model.) 9 Sheets—Sheet 9.

C. S. ELLIS.
TYPE WRITING MACHINE.

No. 559,127. Patented Apr. 28, 1896.

UNITED STATES PATENT OFFICE.

CHARLES S. ELLIS, OF CHICAGO, ILLINOIS, ASSIGNOR TO THE ELLIS-SOUTHWICK COMPANY, OF SAME PLACE.

TYPE-WRITING MACHINE.

SPECIFICATION forming part of Letters Patent No. 559,127, dated April 28, 1896.

Application filed August 3, 1894. Serial No. 519,342. (No model.)

*To all whom it may concern:*

Be it known that I, CHARLES S. ELLIS, of Chicago, in the county of Cook and State of Illinois, have invented certain new and useful Improvements in Type-Writing Machines; and I do hereby declare that the following is a full, clear, and exact description thereof, reference being had to the accompanying drawings, and to the letters of reference marked thereon, which form a part of this specification.

This invention relates to improvements in type-writing machines of that class commonly known as "pivoted type-bar" or "basket" machines.

The machine herein shown as embodying my invention in one form is of that type in which a separate key is provided for each character which the machine is designed to print in contradistinction from being a shifting-carriage machine, or one in which the carriage and platen are moved bodily forward by means of a special key when it is desired to print the upper-case letters and certain of the punctuation-marks; but it will be understood that in many of their features my improvements are equally applicable to the type-writing machines of the latter type.

Figure 6:
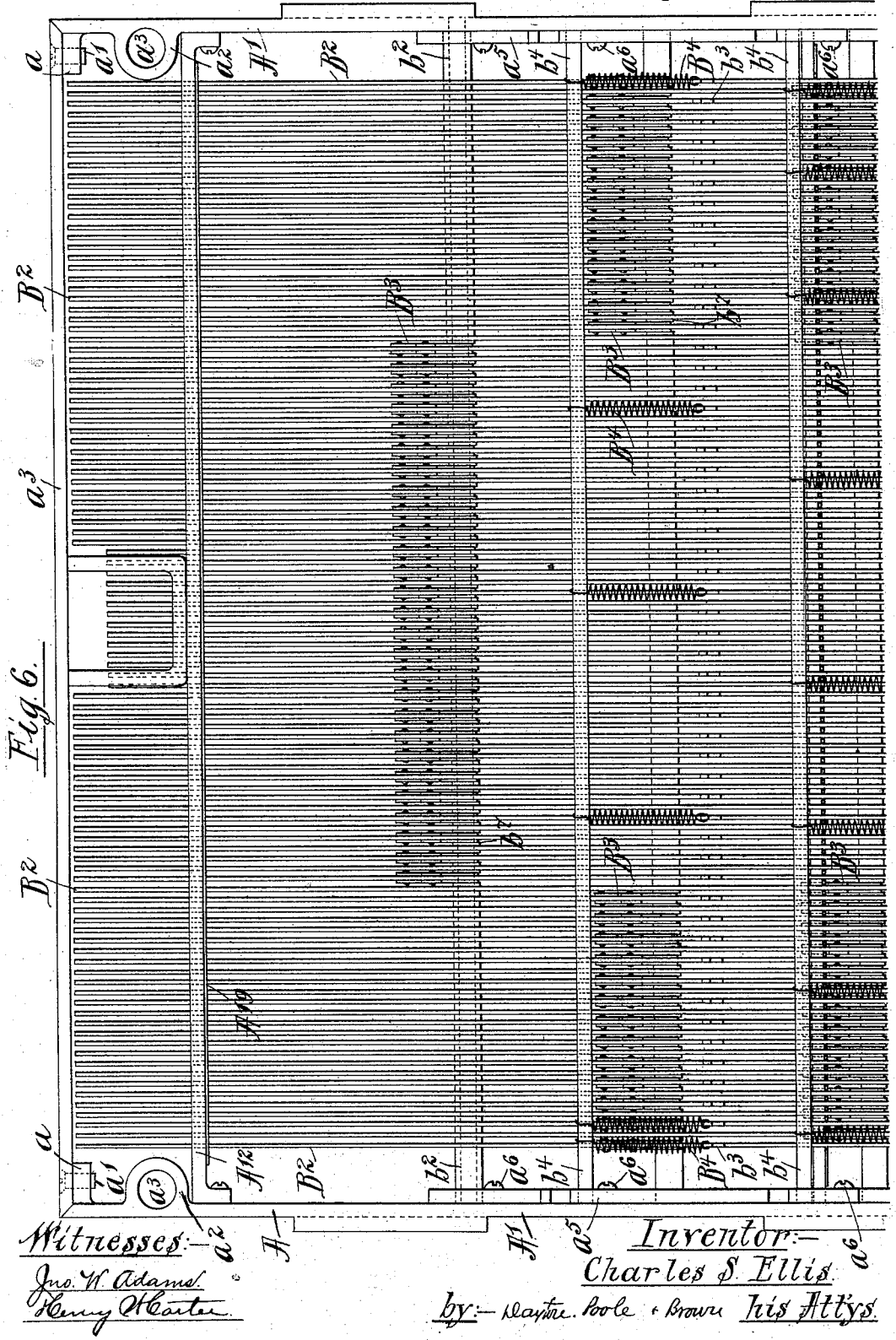
Figure 27:
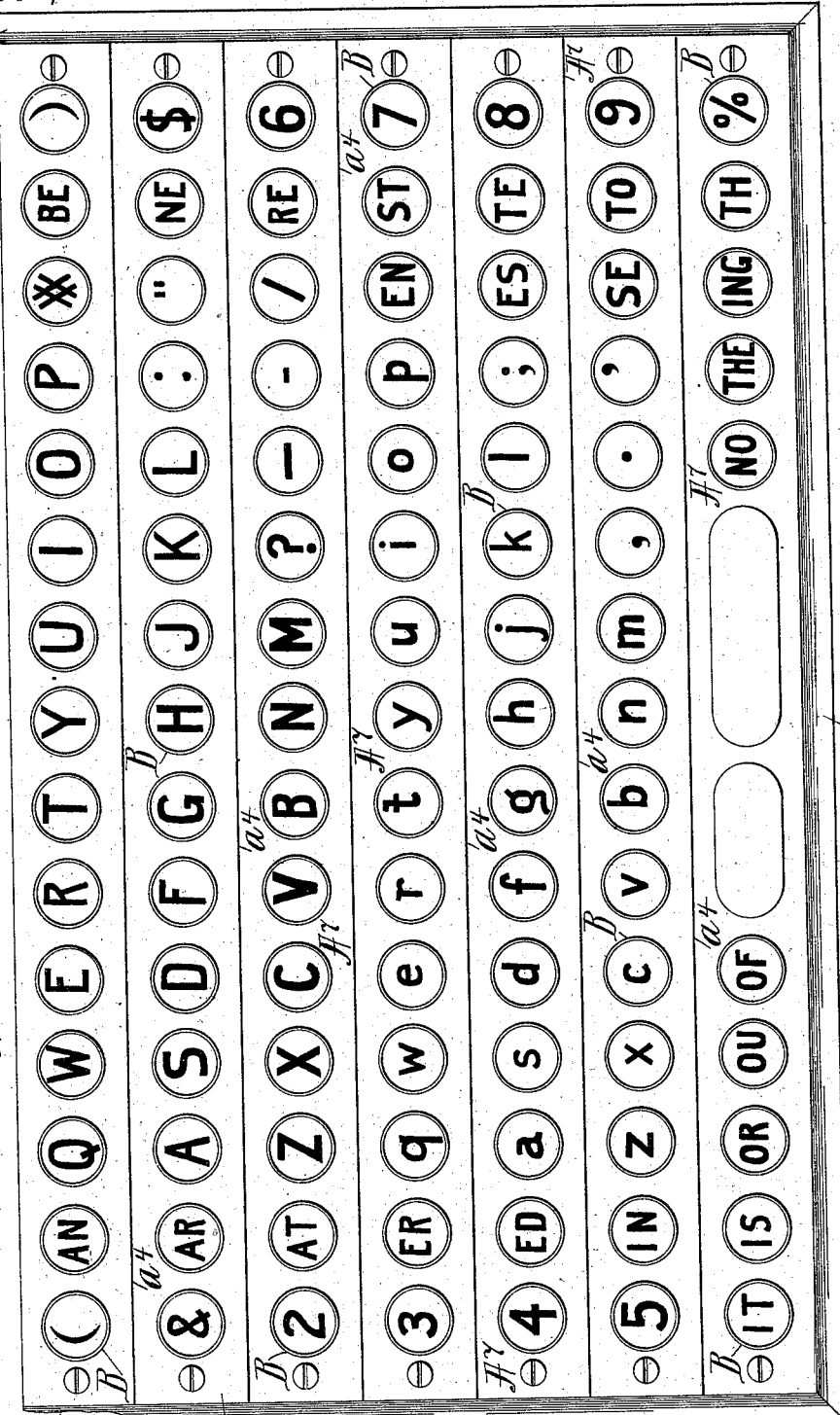

In the accompanying drawings, Figure 1 is a fragmentary side elevation of a type-writing machine constructed in accordance with my invention. Fig. 2 is the top plan view of the upper portion thereof. Fig. 3 is a fragmentary rear elevation of the machine. Figs. 4 and 5 are contiguous parts in side elevation of the lower front portion of the machine, showing the key mechanism. Figs. 6 and 7 are similar contiguous parts of the bottom plan view of the machine. Fig. 8 is a sectional side elevation showing the spacing mechanism. Fig. 9 is a horizontal section taken on line 9 9 of Fig. 8. Fig. 10 is a detail side elevation of the ribbon-actuating mechanism, looking outward from within the machine-frame. Fig. 11 is a sectional detail of the end of the ribbon-roller, taken on line 11 11 of Fig. 10. Fig. 12 is a fragmentary plan view of the basket, showing the manner of pivotally securing the type-bars therein. Fig. 13 is a side view of one of the hangers within which four type-bars, constituting one group, are pivoted. Figs. 14 and 15 are detail views of the largest and smallest type-bars. Fig. 16 is a detail section taken on line 16 16 of Fig. 12. Fig. 17 is a detail of the carriage-actuating drum and escapement. Figs. 18, 19, and 20 are detail views showing the construction of the platen and the manner of supporting and actuating the same. Fig. 21 is a perspective detail of one of the bell-crank levers. Fig. 22 is a fragmentary rear elevation showing a portion of the ratchet connections and a modified form of actuating-spring for the ratchet-lever. Fig. 23 is a detail of one of the ratchet-wheels. Fig. 24 is an end elevation of the carriage and connected parts, showing a somewhat modified form of detent device for holding the platen in its raised or lowered position. Fig. 25 is a fragmentary plan view of the top plate with the carriage removed. Fig. 26 is a detail side view of one of the sliding guides for the inking-ribbon. Fig. 27 is a plan view of the keyboard.

As shown in said drawings, A designates the main supporting-framework, which is preferably made of cast metal and comprises side plates A' A', front and rear plates A$^2$ and A$^3$, and a top plate A$^4$, which is secured by screws or otherwise upon the upper ends of columns or standards A$^5$, made integral with the side plates A' A'. The latter are made separate from the end plates A$^2$ A$^3$ and are provided at their ends with inwardly-projecting lugs $a$, to which said end plates are secured by means of screws $a'$. They are also shown as provided at their lower edges and near their front and rear ends with socket-lugs $a^2$, within which the usual soft-rubber supporting blocks or buffers $a^3$ may be inserted.

B B designate the keys, which are arranged, as usual, in transverse rows or banks placed one above and back of the other at the front of the machine. They are secured to the upper ends of substantially vertical stems $b$, which pass down into the machine-framework through suitable apertures in a transverse plate A$^6$. The latter is formed with a separate step $a^4$ for each bank of keys and rests at its ends on corresponding steps formed on the side plates A' A'. An enameled sheet-metal plate $A^7$, bent to conform to the several steps $a^4$, is in this instance provided upon the transverse plate $A^6$ to afford an appropriate finish to the machine. At their lower ends the key-stems $b$ are severally secured to the upper ends of bell-crank levers $B'$, which are mounted to oscillate on rods $b'$, supported at their ends upon the side plates $A'$ $A'$ of the frame. The lower ends of the bell-crank levers are pivotally attached to the forward ends of horizontal bars $B^2$, arranged longitudinally of the framework, near the bottom thereof.

C designates as a whole the basket of the machine, which comprises a plurality of type-bars $C'$, pivotally mounted in circular order in the upper part of the machine-frame, and a corresponding series of depending links $C^2$, operatively connected at their upper ends to the type-bars $C'$. The lower ends of the links $C^2$ are pivotally secured to the upper ends of bell-crank levers $B^3$, Fig. 5, which are mounted to oscillate upon transverse rods $b^2$, extending between the side frame-pieces $A'$ $A'$ in the same manner as the rods $b'$. The lower ends of the bell-crank levers $B^3$ are pivotally secured to the longitudinal bars $B^2$ at points between the ends thereof, so that when the keys B are depressed said bars will be drawn forward by the bell-crank levers $B'$ and will operate through the bell-crank levers $B^3$ to draw down the links $C^2$ and throw up the type-bars $C'$. Spiral springs $B^4$ in this instance serve to return the bars $B^2$ and connected parts to their normal positions, said springs being placed below the bars $B^2$, with their front ends attached to depending lugs $b^3$ thereon and with their rear ends attached to stationary transverse rods $b^4$, supported in the side plates $A'$ $A'$, Fig. 5. Being of a diameter considerably greater than the width of the bars $B^2$, the springs $B^4$, in order not to interfere with each other, are arranged in two separate rows, one behind the other, the springs of the two rows being connected to alternate ones of the bars $B^2$.

As shown in this instance, the bell-crank levers $B^2$ and $B^3$ are made double, being each stamped from a single piece of metal and comprising two similar sections $b^5$, of the same general outline as the finished bell-crank, connected together by an integral rib $b^6$, as shown in Fig. 21. Said levers are placed upon the transverse pivot-rods $b'$ $b^2$ in alinement with the longitudinal bars $B^3$ and are secured against lateral displacement on said rods by means of tubular sleeves or collars $b^7$, which are cut to suitable lengths and placed upon the rods between the levers. Said rods $b'$ and $b^2$ are herein shown as supported by being inserted at their ends in horizontal strips or cleats $a^5$, secured to the side plates $A'$ $A'$ by means of screws $a^6$ or otherwise. The transverse rods $b^4$, to which the springs $B^4$ are attached, are also shown as inserted at their ends in said strips $a^4$. The longitudinal bars $B^2$ are in this instance conveniently made of wires cut to the proper length and bent at their forward ends and at proper points between their ends to form loops $b^8$ and $b^9$, respectively, through which are passed the pins which pivotally connect the bars with the bell-crank levers $B'$ and $B^3$, Fig 5. The keys B of the several banks are preferably arranged in straight rows longitudinally as well as transversely, and the stem $b$ of each bar is bent laterally to whatever slight extent may be necessary to effect its connection with the proper bell-crank $B'$.

In order to simplify the construction as far as practicable, the bell-cranks $B^3$ are distributed in groups upon a comparatively small number of the pivot-rods $b^2$, and the lower ends of the connecting-links $C^2$ are bent backward or forward to the necessary extent to effect their connection with the upper ends of said bell-cranks. As herein shown, the pivot-rods $b^2$ are four in number, and the bell-cranks $B^3$ are distributed upon them in six groups, one each at the centers of the front and back rods and one at each end of each of the two intermediate rods. Obviously, however, a greater or less number of the pivot-rods $b^2$ may be employed, if desired, and the bell-crank levers $B^3$ may be distributed thereon according to any other convenient arrangement which does not involve so great a lateral deflection of the lower ends of the links $C^2$ as to render them liable to spring or yield when the keys are struck, instead of throwing up the type-bars in the desired manner.

The mechanism thus described for operating the type-bars when the keys are struck, by means of reciprocatory longitudinal bars connected by bell-crank levers to the key-stems and type-bar links, may be advantageously employed upon other forms of basket type-writing machine than the particular one herein described. By such construction an equal leverage is exerted upon all the type-bars no matter to what extent the distance between their connecting-links and corresponding keys may vary, so that an even impression upon the printed sheet will be produced when the operator strikes the several keys equally hard. The longitudinal bars $B^2$, being subjected to tensile strain only, may be made very small or light without having any tendency to bend or buckle no matter what their length may be, and the construction is otherwise simple and secure from getting out of order.

Referring more particularly to the construction of the basket C as herein shown, $C^3$ designates its upper marginal ring, which is supported within the usual circular aperture in the top plate $A^4$ of the machine by means of lugs $a^7$ $a^7$, which project into said aperture and to the under face of which the ring is fastened by screws $a^8$ $a^8$. Depending from the under side of said ring $C^3$ are brackets $C^4$, each of which comprises a horizontal flange $c$ and an integral vertical flange $c'$. The horizontal flange $c$ is placed against the under surface of the ring $C^3$ and is secured thereto by means of screws $c^2$, preferably with the parts so arranged that the vertical flanges $c'$ of the brackets stand at a considerable angle with the corresponding radii of the circle of the basket. The type-bars $C'$ are pivotally supported between the depending flanges $c'$ of the adjacent brackets in groups of four, as herein shown, although the groups might each consist of a greater or less number of type-bars, if desired. The pintle $c^3$ of each of the type-bars is formed by a hardened steel wire, which is driven tightly into an aperture $c^4$ at the inner end of the type-bar and is made just long enough to pass freely between the depending flanges $c'$. The four pintles $c^3$ of each group are arranged one above the other and are supported at their ends by opposite pivot-screws $c^5$ $c^6$, having a screw-threaded bearing in the depending flanges $c'$. Said pintles are not placed tangentially with reference to the circle of the basket, but are arranged nearly at right angles to the flanges $c'$, each of the type-bars being bent, as shown at $c^7$, so as to strike the center of the basket, notwithstanding such angular arrangement of the pintles. As herein shown, the pivot-screws $c^5$ at one end of the pintles are arranged in a vertical row adjacent to the outer edge of the flange $c'$, which they engage, while the pivot-screws $c^6$ at the opposite ends of the pintles are arranged in an upwardly and outwardly inclined row, the lowermost screw of which is located adjacent to the inner edge of its depending flange $c'$, while the uppermost screw is located as near the outer edge of the flange as is possible without its interfering with the adjacent upper pivot-screw $c^5$ of the next succeeding group of type-bars. The type-bar $C'$, whose pintle is placed lowermost, is located on said pintle immediately adjacent to its pivot-screw $c^6$, while the type-bar on the uppermost pintle is located at the opposite end of the same adjacent to its pivot-screw $c^5$, and the type-bars of the intermediate pintles are arranged thereon at intermediate points in a uniform manner, the bars being thereby arranged in successive vertical planes spaced at regular distances apart. By this construction the same variance in the angular arrangement of the pintles is secured as would naturally occur if the type-bars were arranged radially about the basket with their pintles tangent thereto.

The outer or type ends $c^8$ of the several type-bars of each group are made of different lengths, as indicated in Figs. 15 and 16, according to the height of the horizontal plane in which their pivot-pintles are located, the length of said ends $c^8$ being in all cases such as to bring the type in contact with the platen when the body of the type-bar stands in a substantially horizontal position, so that a perfectly square and even impression is obtained no matter at what level the type-bar is pivoted. At their inner ends the type-bars are formed with short arms $c^9$, which are pivotally connected to the upper ends $c^{10}$ of the connecting-links $C^2$, said upper ends $c^{10}$, as herein shown, being forked to embrace the type-bar ends $c^9$. Each of the connecting-links $C^2$ is provided with a turnbuckle $c^{11}$, by means of which its length may be adjusted to throw the type-bars as desired. In assembling the machine the set-screws $c^6$ are screwed tightly in place and afterward cut off close to the flange $c'$, the adjustment of the pintles being thereafter effected by the screws $c^5$. When the keys are released, the type-bars $C'$ fall back against the usual padded ring $C^5$, located near the bottom of the basket and herein shown as supported by depending arms $c^{12}$, provided on several of the brackets $C^4$ and extending downwardly from the flanges $c'$ thereof.

D designates a transversely-sliding carriage mounted upon the top of the machine and supporting a cylindrical platen E. As herein shown, said carriage comprises transversely-extending front and rear bars $D'$ $D^2$, respectively, connected at their ends by rigid side frames $D^3$. The carriage is mounted to slide upon steel ways $A^8$ and $A^9$, which are secured to the top of the machine-frame by means of screws $a^9$ at a slightly less distance apart than the carriage-bars $D'$ and $D^2$. The outer or front face of the front way $A^8$ is formed with a longitudinal rectangular groove $a^{10}$, which is engaged by an antifriction-wheel $d$, located on the rear or inner face of the front carriage-bar $D'$. Normally the friction-roller $d$ rests and rolls upon the bottom of the groove $a^{10}$; but its diameter is substantially equal to the width of the groove, so that it will also prevent the front of the carriage being lifted from the way. The rear way $A^9$ is provided at its lower rear edge with a projecting flange $a^{11}$, upon which antifriction-rollers $d'$, located in recesses in the inner face of the rear carriage-bar $D^2$, are adapted to rest and roll. Said bar $D^2$ is recessed at its lower front edge to receive the flange $a^{11}$ and normally stands with its inner face closely adjacent to the rear face of the way $A^9$. A bearing-strip $A^{10}$, secured to the top of the way $A^9$, projects rearwardly over the front edge of the bar $D^2$ and is provided with a V-shaped rib $a^{12}$, fitting within a corresponding longitudinal groove in the top of said bar. Said bearing-strip is in this instance adjustably secured to the top of the way $A^9$ by means of fastening-screws $a^{13}$, which pass through apertures in the strip and have screw-threaded engagement with the way, and adjacent set-screws $a^{14}$, which engage screw-threaded apertures in the strip and are adapted to rest at their points upon the top of the way. Obviously by adjusting the set-screws $a^{14}$ before the screws $a^{13}$ are tightened the bearing-strip may be clamped to the way, so as to engage the bar $D^2$ more or less tightly, as desired. The engagement between the rib $a^{12}$ and the grooved upper face of the bar $D^2$ maintains the carriage in exact alinement with the ways and prevents its being lifted off the same at its rear edge. Perfect alinement of the bearing-strip $A^{10}$ with the way $A^9$ is secured by means of a depending flange $a^{15}$ at the front edge of the strip, which engages the adjacent face of the way.

The cylindric platen E is herein shown as journaled within a rigid framework, comprising L-shaped end pieces E', Fig. 20, and transverse rods $E^2$ and $E^3$, which rigidly connect the upper and lower free ends of said L-shaped end pieces, the corner or angle of the end pieces E' being bored out to afford bearings for the ends of the shaft $E^4$ of the platen. The transverse bar $E^3$, which connects the lower and free ends of the side pieces E', serves to pivotally support the usual sheet-metal paper-guide $E^5$, which is provided at its end with curved metal bars $E^6$, having apertured lugs $e$, through which the rod $E^3$ passes. The lower ends of the bars $E^6$ project below the guide-plate $E^5$ to support a relatively small guide-roller $E^7$, located just below the guide-plate $E^5$ and herein shown as journaled upon pivot-pins $e'$, which pass through the bars $E^6$ and have adjustable screw-threaded engagement therewith. Below the roller E the ends of the bars $E^6$ are cut off upon a plane substantially tangent to the platen E, and a narrow transverse guide-strip $E^8$, which may be graduated to form a scale, is secured at its ends to their under surfaces by screws $e^2$, said strip being located immediately below and in front of the roller $E^7$, Figs. 18 and 20, with its forward edge adjacent to the surface of the platen E. Spring guide-strips $e^3$ are also secured to the lower ends of the arms $E^6$ by being inserted between the same and the ends of the guide-strips $E^8$ and extend forwardly a considerable distance around the periphery of the platen, being bent to conform to the curvature of the same. Said spring-strips $e^3$ are made of sufficient width to slightly underlap the ends of the roller $E^7$ and serve to support the edges of the paper when the same has passed beyond the roller $E^7$ and the guide-strip $E^8$. Coiled springs $e^4$, Fig. 18, located on the ends of the rod $E^3$ between the end pieces E' and the bars $E^6$ and attached at opposite ends to said side pieces and bars, tend by their resilience to swing the lower ends of the bars $E^6$ toward the platen, and to thereby hold the roller $E^7$ yieldingly in contact with the same.

The platen-supporting framework thus described is herein shown as pivotally and detachably mounted in the carriage D as follows: The side pieces E' are located at a slightly less distance apart than the end frames $D^3$ of the carriage, so as to pass readily between the latter, and the ends of the rod $E^2$ project through said side pieces E' to form journal-bearings $e^5$, which are adapted to rest in open slots $d^2$, provided centrally in the upper edges of the said side frames $D^3$ of the carriage. The ends $e^6$ of the platen-shaft $E^4$ also project through the side pieces E' and are adapted for engagement with open-ended arc-shaped slots $d^3$, also provided in the side frames $E^3$ and arranged concentrically with the lower ends of the slots $d^2$. Said slots $d^3$ are made just wide enough to receive the ends of the shaft $E^4$ and terminate at their lower ends at points directly beneath the lower ends of the slots $d^2$. As herein shown, the slots $d^2$ are made with an upward and rearward inclination, and their forward or upper sides or surfaces $d^4$ are made somewhat longer than their rear or lower sides, thereby forming an upwardly-projecting lip $d^5$ in front of the slots, against which the rod $E^2$ will strike when moved forwardly upon the top of the frames $D^3$ and be thereby guided into the slots $d^2$. The upper open end of the slot $d^3$ is similarly inclined upwardly and rearwardly and provided on its front side with an upwardly-projecting lip $d^6$. Consequently in order to place the platen on the carriage it is only necessary to rest the ends of the rod $E^2$ and shaft $E^4$ upon the upper surface of the end frames $D^3$ and move them bodily forward until they strike the lips $d^5$ $d^6$, when they will be at once guided into their respective slots. The projecting ends $e^6$ of the shaft $E^4$ are herein shown as extending considerably beyond the side frames $D^3$ and as provided with hand wheels or disks $e^7$, by means of which the platen may be conveniently manipulated.

When the platen is placed within the carriage in the manner described and the shaft $E^4$ is swung down to engage the lower inner end of the slots $d^3$, the center of the platen stands directly above the center of the basket C and is adapted to hold the paper in the proper position to receive the imprint of the type. The platen is normally maintained in this position by a spring $d^7$, which is secured by screws $d^8$ to the outer surface of one of the side frames $D^3$ and is bent at its end so as to engage the shaft $E^4$ when the latter is located within the inner ends of the slots $d^3$ and hold the same against forward or upward movement. When the platen is swung upwardly about the rod $E^2$ until the shaft $E^4$ stands within the outer ends of the slots $d^3$, its normal lowermost portion will obviously be brought into an approximately vertical position, so as to fully expose the line being printed. This position of the platen is maintained, when desired, by means of a spring $d^9$, similar to the spring $d^7$, which is bent to engage the lower portion of the shaft $E^4$ when the latter is in such raised position and prevent the same from dropping. As herein shown, the springs $d^7$ and $d^9$ are made integral with each other and are secured to the frame $D^3$ by the same screws $d^8$. Enlarged heads $e^8$ are in this instance formed on the ends of the rods $E^2$ outside of the journal portions $e^5$ at a distance apart just equal to the distance between the outer faces of the end frames $D^3$, so that when the journals $e^5$ are dropped into the slots $d^2$ said heads $e^8$ closely engage the frames and hold the platen against longitudinal movement relatively to the carriage.

To effect the necessary rotation of the platen E required to move the paper along from line to line, said platen is provided at one end, preferably and as herein shown its right-hand end, with a rigidly-secured ratchet-flange $E^9$. Said ratchet-flange is constantly engaged by a spring $e^9$, secured to side pieces $E'$ and serving to normally hold the platen against rotation.

$D^4$ designates a reciprocatory horizontal bar, located at the lower edge of the frame-piece $D^3$ adjacent to the ratchet-flange $E^9$. Said bar in this instance is provided at its front and rear end with slots $d^{10}$, through which guiding and supporting screws $d^{11}$ are loosely inserted and screwed into the adjacent surface of the frame-piece $D^3$. Between its ends the bar is provided with a slot $d^{12}$, within which a pawl $d^{13}$ is pivotally secured at its rear end. The front end of said pawl is adapted to engage the ratchet-flange $E^9$ and is held in constant contact therewith by a spring $d^{14}$, secured to the bar and tending to constantly throw the pawl inwardly. At its forward end the bar $D^4$ is formed with an upwardly-projecting part $d^{15}$, which is pivotally connected by a link $D^5$ with a swinging lever $D^6$. The latter is pivoted at its outer end between lugs $d^{16}$ at the end of the front carriage-bar $D'$ and normally remains in close contact with said bar $D'$. Its outer face is provided with a projecting lug $d^{17}$, within which any suitable finger-piece or handle $d^7$ is rigidly secured.

When it is desired to rotate the platen E, the lever $D^6$ is swung on its pivot by means of the handle $D^7$, so as to draw the reciprocatory bar forward, and in the movement of said bar the pawl $d^{13}$ will obviously strike the adjacent teeth of the ratchet-flange $E^8$ and impart a rotary motion to the platen, the extent of which will depend on the extent to which the bar $D^4$ is moved. The bar is returned to its normal position by any suitable spring $D^8$, herein shown as provided in the form of an ordinary coiled spring placed upon a horizontal pin $d^{18}$, Fig. 19, which is secured at one end in the frame $D^3$ adjacent to the supporting-screw $d^{11}$ and at its other end passes loosely through an apertured lug $d^{19}$, projecting from the face of the bar $D^4$.

$D^9$ designates a rotary sleeve provided with an enlarged milled head $d^{20}$ and revolubly secured by means of a screw $d^{21}$ to the face of the carriage-bar $D'$ adjacent to the free end of the lever $D^6$. The milled head $d^{20}$ of the sleeve is arranged to project into the path of the lever $D^6$ and forms a positive stop by which the movement of the latter is limited. Said sleeve is also provided about midway of its length with a stop pin or shoulder $d^{22}$, which by the turning of the sleeve may also be brought into the path of the lever $D^6$ and will then restrict the movement of the latter to about half the distance permitted by the milled head. Ordinarily the parts will be so proportioned that the movement of the lever $D^6$ before striking the milled head $d^{20}$ of the sleeve will be sufficient to rotate the platen to the extent of two teeth of the ratchet, while the movement permitted by the stop $d^{22}$, when the same is in position to engage the lever, will only be sufficient to rotate the platen to the extent of one tooth of the ratchet. Consequently by turning the sleeve $D^9$ slightly, so as to throw the stop $d^{22}$ into or out of the path of the lever $D^6$, a single or double spacing may be secured between the lines, as desired.

The carriage is normally maintained under a constant tension tending to draw it across the machine from right to left by a drum F, which is turned by the carriage-actuating spring. Said drum is located at the left-hand side of the machine-frame in the same vertical plane with the rear bar $D^2$ of the carriage and connected with said bar by means of a flexible band $F'$, which is attached at one end to the periphery of the drum and at its other end to said bar by means of screws $f$ and $f'$, respectively. Said drum is revolubly mounted in the usual manner upon a horizontal shaft G, journaled in suitable bearings $g$, provided on the inner faces of the left-hand frame-standards $A^5$. The shaft is provided with the usual rigidly-attached spring-barrel $G'$, which extends into the drum F and to which the inner end of the coiled spring within the drum and not herein illustrated is secured in a familiar manner. A suitable key or handle $G^2$ on the end of the spring-barrel enables the shaft G to be turned to give any required degree of tension to the spring. The shaft is adjustably held against rotation under the tension of the spring by means of a rigidly-attached ratchet-wheel $G^3$, which is controlled by an ordinary escapement-lever $G^4$, pivoted to the adjacent standard $A^5$ and engaging the ratchet-wheel in a familiar manner.

H designates the gong which serves to notify the operator when the end of the line is approached. Said gong is mounted upon a suitable standard $h$, secured to the frame A directly beneath the spring-barrel F. A hammer or tongue $H'$, by which the gong is struck, is pivoted at $h'$ to the adjacent standard $A^5$ in close proximity to the spring-barrel F and is provided at its upper end with a pivoted pawl $h^2$, which overlaps the face of said barrel. Said pawl projects into the path of a stop $f^2$, provided on the face of the drum F, and the pawl is so arranged that in the passage of the stop as the carriage moves to the left the tongue $H'$ will be caused to bodily oscillate, so as to ring the gong H, while in the passage of the stop as the carriage moves in the opposite direction said pawl will be free to swing on its pivot without oscillating the tongue $H'$. As a further improvement the stop $f^2$ is in this instance formed by an outwardly-projecting lug provided on the periphery of a thin disk $F^2$, which is revolubly mounted on the spring-barrel G' adjacent to the face of the drum F. An arc-shaped slot $f^3$, concentric with the drum, is provided in the disk, and a thumb-screw $f^4$ is passed through said slot into the face of the drum. By this construction the disk $F^2$ may obviously be adjusted upon the drum so as to cause the gong to ring when the carriage has approached the end of its movement by any desired distance.

The usual inking-ribbon commonly employed in this type of machines is designed to be wound upon drums I and I', respectively, which are revolubly mounted at opposite sides of the machine beneath the platen E. The drum I at the left of the machine is herein shown as loosely mounted upon the shaft G and is adapted to slide longitudinally upon the same. The other drum I' is mounted upon a horizontal shaft $I^2$, journaled in bearings secured to the standards $A^5$ at the right of the machine, said drum being arranged to engage a feather $i$ on said shaft, so as to be held against rotation relatively thereto, while capable of longitudinal movement thereon. Both of the drums I and I' are provided at their rear ends with rigidly-attached grooved sleeves $i'$, which are engaged by spherical heads $j$ on the upper end of pivoted levers J. The latter are rigidly attached to the opposite ends of a transverse rod or shaft J', extending between the side plates of the machine-frame at the bottom thereof, and are arranged to stand parallel with each other, each in the same vertical plane with the axis of the adjacent drum I'. A flexible strand or cord $j'$ is attached at one end to the lever J at the left of the machine, trained around a pulley $j^2$ of the adjacent standard $A^5$, and attached at its opposite end to a collar $F^3$ on the inner face of the drum F, so that in the rotation of the drum the cord is wound around the collar and serves to swing the upper end of the lever J toward the rear of the machine. As the cord is unwound in the opposite movement of the drum the upper ends of the levers are swung toward the front of the machine by a coiled spring $J^2$, secured to the left-hand lever J and to the adjacent side plate A'. By reason of the engagement of the upper ends of said levers J J' with the grooved periphery of the collars $i'$ the drums I I' will obviously be moved longitudinally on the shafts G and $I^2$ as said levers are oscillated.

The front ends of the drums I and I' are herein shown as provided with ratchet-teeth $i^2$, which, as the drums are moved forwardly on their shafts, are engaged by pivoted pawls $I^2$, secured by screws $i^3$ to the outer faces of the forward standards $A^5$. Short radial projections $i^4$ on the hubs of said pawls normally engage stop projections $i^5$, provided on said standards adjacent to the screws $i^3$, and maintain the free ends of the pawls in proximity to the plane of the shafts G and $I^2$ and in position to operatively engage the ratchet-teeth $i^2$. By this construction as the carriage moves to the left in the usual step-by-step manner when the keys are struck the drums I I', bearing the inking-ribbon, will be gradually moved forward on their supporting-shafts and will obviously carry said inking-ribbon with them, so that the latter will present a new surface to the action of each succeeding type. As they approach the forward limit of their movement the front ends of the drums will strike the pawls $I^2$, and by the action of the latter will be given a slight rotary movement, by which the ribbon will be fed along a short distance, so that in the printing of the succeeding line an entirely new transverse zone of the ribbon will be presented to the action of the type. In this manner the ribbon will be gradually unwound from the drum I' and wound upon the drum I by a succession of intermittent rotary impulses imparted to the drums at the end of each longitudinal reciprocation of the latter, so that when it has been fed along its entire length every portion of the surface of the ribbon will have been exposed to the action of the type. A crank-handle $I^3$ on the rear end of the crank $I^2$ permits the ribbon to be wound upon the drum I' in the first instance and to be rewound upon the same after having been wound upon the drum I by the action of the machine in the manner stated.

The employment of drums or ribbon-spools having grooved sleeves, in connection with the rigidly-attached pivoted levers J, engaging said grooves at their ends, has the advantage of affording an exceedingly simple means for actuating the said spools, and one which is cheaper to construct and less likely to get out of order than the more complicated devices heretofore employed for this purpose.

Between the drums or spools I I' the ribbon passes through slots $i^6$ in the top plate $A^4$ of the machine and over guides $I^4$, which are mounted to slide within said slots. Said guides $I^4$ each comprise a flat body portion or plate $i^7$, over which the ribbon passes, and side flanges $i^8$, between which it is guided, said flanges being spaced the same distance apart as the flanges of the spools I I'. The upper part $i^9$ of the body portion $i^7$ is bent inwardly to rest within a countersunk recess $i^{10}$, provided in the top plate $A^4$ on the inner side of the slot $i^6$. The lower ends of the side flanges $i^8$ are formed with inwardly-projecting lugs $i^{11}$, which are apertured to receive a horizontal guiding and supporting bar or rod $I^5$, the latter being mounted at its ends in depending brackets $I^6$. Said guides are so located with reference to the drums I I' that the lower outer corners of their body portions $i^7$ fit between the flanges of the spools I I', and as the latter are moved endwise on their shafts the guides $I^4$ are carried with them, the side flanges $i^8$ of the guides being cut away, as shown at $i^{12}$, to permit the passage of the drum-flanges.

$D^{10}$ designates an adjustable stop for limiting the movement of the carriage to the right, or, in other words, for determining the left-hand margin of the printed page. As herein shown, said stop is made in the form of a sheet-metal clip having an elongated slot $d^{23}$, through which a clamping-screw $D^{11}$ is passed into the rear cross-bar $D^2$ of the carriage near the left-hand end of the same. A depending flange $d^{24}$ on the front edge of the clip engages the front side of the bar $D^2$ and maintains the clip in alinement therewith. At its right-hand end the clip is formed with a forwardly-projecting point $d^{25}$, which extends over the bearing-strip $A^{10}$ and is adapted to strike against a stop-shoulder $D^{12}$ thereon as the left-hand end of the platen E reaches a point superjacent to the center of the basket. The exact position of the carriage as its movement is thus limited by the contact of the stops $D^{10}$ and $D^{12}$ will of course depend upon the position in which the stop $D^{10}$ is adjusted on the bar $D^2$, which may obviously be varied, as desired.

In Fig. 24 I have shown a slightly different form of detent device for maintaining the platen E in either its raised or lowered position in the carriage. In said figure $D^{13}$ designates a detent-lever, which is pivotally secured between its ends to the end frame $D^3$ of the carriage by a screw $d^{26}$. The rear end of the detent is arranged to normally engage the front side of the platen-shaft $E^4$ when the latter is occupying the extreme lower ends of the slots $d^3$; but the detent may be swung on its pivot-screw $d^{26}$, so as to drop its rear end beneath the level of the slots $d^3$ and release the platen-shaft. $D^{14}$ is a second detent-lever, also pivotally secured to the frame $D^3$ by a screw $d^{27}$. The lower end of the detent $D^{14}$ overlaps the forward end of the detent $D^{13}$, and the two levers are connected to move simultaneously by a pin $d^{28}$ on the lever $D^{13}$, which projects through a slot $d^{29}$ on the lever $D^{14}$. Near its upper end the latter is provided with an upwardly-facing shoulder $d^{30}$, which projects part way across the adjacent slot $d^3$ when the rear end of the detent $D^{13}$ is raised to stand opposite said slot. A spring $D^{15}$, secured to the carriage-frame and exerting a constant upward pressure on the rear end of the detent $D^{13}$, normally maintains the same in its raised position, and a finger-piece $d^{31}$ on the top of the lever $D^{14}$ enables the detents to be readily swung clear of said slot $d^3$ against the pressure of said spring $D^{15}$. The movement of the detents in either direction is limited by the contact of a pin $d^{32}$ of the carriage with the ends of a slot $d^{33}$ in the lever $D^{14}$, through which said pin projects. With this construction in placing the platen in the carriage it will be necessary to draw back the detents far enough to permit the platen-shaft to pass the shoulder $d^{30}$. After passing said shoulder the shaft is free to drop to the extreme lower ends of the slots, whereupon the rear end of the detent $D^{13}$ will be thrown up in front of the shaft and maintain it in that position. In raising the platen the detents are withdrawn far enough to release the platen-shaft, and the latter is then raised above the shoulder $d^{30}$, whereupon the latter is forced beneath said shaft and holds the platen elevated until the detents are again withdrawn.

The mechanism herein shown for directly controlling or determining the feed motion of the carriage is so constructed that as the same is advanced step by step to bring the paper into position for successive action for the types thereon it is moved through varying distances to permit the use of types having varying widths of faces, whether bearing single letters or groups of letters, it being understood that the types carried by the several bars may be of any desired width and may embrace any desired number of letters, since the invention contemplates a movement of the carriage by each key a distance corresponding with the space required for the type actuated by that key.

Fig. 27 shows a keyboard containing keys lettered and arranged in a manner preferred by me, the same containing not only the usual letters, figures, and punctuation-marks, but also type-words or combinations of letters intended to greatly increase the rapidity with which writing can be done by the use of the machine. Said mechanism in many of its features is substantially similar to that shown in my prior applications, Serial No. 496,570, filed January 12, 1894; Serial No. 502,791, filed March 8, 1894, and Serial No. 508,652, filed April 23, 1894, and its construction in detail is as follows: K designates a revolving shaft arranged horizontally and at right angles with the path of the carriage D at the rear thereof, said shaft being herein shown journaled in bearings $k$, provided at the ends of an open loop-shaped frame $A^{11}$, secured upon the top plate $A^4$ of the machine-frame. Said shaft K is provided with a gear-wheel or pinion K', which intermeshes with a rack $D^{16}$, formed on the rear bar $D^2$ of the carriage, so that endwise movement of the latter under the pressure of its actuating-spring imparts a rotary motion to the said shaft.

The rotation of the shaft K is controlled and the carriage is thereby arrested after movements through varying distances upon the reaction of the several key-levers through the medium of the following devices: L designates a ratchet-wheel which is rigidly secured to the shaft K and which has its teeth so directed that those at its top present their abrupt faces toward the side of the machine toward which the carriage is moved by the pressure of its actuating-spring. L' is a second ratchet-weel mounted to turn on the shaft K and arranged adjacent to the ratchet L, the teeth of the ratchet L' being directed in the same way as those of the ratchet L. The two ratchets L and L' are separated from each other by a short space or distance, the ratchet L' in the particular construction illustrated being provided with a central hub or sleeve $l$ on its side nearest the ratchet L, which hub affords a more extended bearing of said rod on the shaft and at the same time keeps the ratchets at the desired distance apart. Between the ratchets L and L' is located a spring M, so applied that its resilient action tends to turn the ratchet L' in the same direction that the shaft revolves in the advance movement of the paper-carriage, said spring being herein shown as a coiled spring placed about the hub $l$ and attached to the adjacent faces of the ratchets, though it may obviously be of other form and otherwise applied, as found desirable in practice. The rotative movement of the ratchet L' on the shaft under the action of the spring M is limited by means of suitable stops (herein shown as having the form of stop-pins) $l'$ $l^2$, extending from the adjacent faces of the ratchets L and L', respectively, and adapted to engage each other when the ratchet L' is restrained from forward rotation and the shaft K is turned forward by the movement of the carriage. The rotative movement of said sleeve in the opposite direction is ultimately limited by a second stop-pin $l^3$, located on the ratchet L in position for contact with the other side of the stop-pin $l^2$, which thus has a possible vibratory motion between the stop-pins $l'$ and $l^3$.

On the shaft K, adjacent to the ratchet K', is a sleeve or collar N, which is held from rotation on the shaft by a spline $k^2$, but is free to slide endwise thereon. In the particular instance shown the inner end of the spline $k^2$ reaches to the face of the ratchet L' and forms a shoulder by which the ratchet is held from endwise movement on the shaft. Said sleeve N is provided at its end adjacent to the ratchet L' with a concentric parti-cylindric flange N', adapted to enter a parti-circular slot $l^4$, formed in the ratchet L' opposite said flange. The flange N' is provided on its outer edge with a series of steps or shoulders $n$, which in this instance are four in number, or one less than the number of units of movement of the shaft K, contained in the possible total movement thereof, and which are separated from each other by an angular distance corresponding with the angular distance between the teeth of the ratchets L L'. The several steps or shoulders $n$ constitute stops, either of which may be made to limit the forward movement of the ratchet L', under the action of the spring M, by contact of the end of the slot $l^4$ in said ratchet with one or another of said shoulders according to the distance to which the shouldered flange N' has been thrust into the said slot by movement of the sleeve endwise on the shaft. When the sleeve is entirely withdrawn from the slot, the ratchet L' is free to revolve through its greatest possible extent of movement, or until the stop-pin $l^2$ strikes the stop-pin $l^3$. The latter is herein shown as relatively located forward of the last or outermost shoulder of the sleeve an angular distance equal to one ratchet-tooth, so that five units of movement, each equal to one ratchet-tooth, constitutes in this instance the total possible rotary movement of the ratchet L' relatively to the ratchet L and shaft K. Said sleeve N is given variable endwise movement on the shaft for the purpose of bringing a desired shoulder into position to act as a stop or of withdrawing it altogether from the slot $l^4$ through the medium of devices hereinafter described, which are actuated by the several reciprocatory bars $B^2$ when the corresponding keys B are struck.

O designates a lever arranged to oscillate on a pivot $o$ in a plane parallel with the axis of rotation of the shaft K and carrying at its free end a pawl O', which is adapted to engage one or the other of the two ratchets L L' at opposite limits of the vibratory movement of the lever O. The pivot $o$ is in this instance made in the form of a transverse rod or shaft, which is supported at its ends between adjustable pivot-pins $o'$, the latter being provided in the lower ends of depending hanger-arms $o^2$ and being adjustably secured therein by set-screws $o^3$. At its lower end the lever O is pivotally connected by a link $O^2$ with a short radial arm $p$, projecting upwardly from a transverse rock-shaft P. The latter is mounted at its ends in apertures provided in cleats $a^{16}$, which are screwed to the inner face of the side plates A' of the machine-frame. Said rock-shaft P serves to support a rigidly-attached transverse leaf or blade P', the lower free end of which is located in close proximity to the longitudinal bars $B^2$. A suitable spring $O^3$, herein shown as an ordinary coiled spring applied to the pivot $o$, is arranged to normally throw the lower end of the lever O forward and hold the blade P' in contact with the front sides of stop pins or projections $b^{10}$, one of which is located on each of the longitudinal bars $B^2$.

The pawl O' is pivoted to the vibrating arm O and is provided with a rigid arm $o^4$, adapted for contact with the lever O in such manner that the pawl will be held from backward movement when in contact with the abrupt face of one of the ratchet-teeth, so as to positively hold the ratchet with which it is engaged from forward rotation in the direction in which the shaft is turned by the carriage-actuating spring, but so as to permit said pawl to yield and allow the ratchet engaged by it to turn freely backward and thereby permit backward turning of the said shaft. This enables the carriage D to be returned to its starting-point by the operator either when the end of the line is reached or at any other time, as desired, the shaft K merely turning backward as the carriage is moved without affecting in any way the action of the feeding devices. Said pawl O' may be yieldingly held in working position either by a spring or weight, the arm $o^4$, in the particular construction shown, being made sufficiently heavy to retain the pawl in such working position. The ratchet-engaging end of the pawl O' is wider than the space between the ratchets L L', so that it continues in engagement with one until it engages the other. The teeth of the ratchets L L' are of equal size and the stops or pins $l'$ $l^2$ $l^3$, as well as the shoulders $n$ of the stop-flange N', bear such angular relation to the ratchet-teeth that when the shaft and ratchets are at rest the teeth of the ratchets will be opposite to each other, so that the pawl O' may be swung laterally from engagement with the tooth of one ratchet into engagement with the opposite tooth of the other ratchet. Normally the pawl O' rests in engagement with the loose ratchet L', but lateral movement of the pawl from its engagement with the ratchet L takes place at each depression of any key by reason of the oscillatory movement of the blade P', caused by the action of the stop $b$ of that longitudinal rod $B^2$ which is reciprocated by the depression of the key, the reëngagement of the pawl with the ratchet L' taking place upon the ascent of the key.

From this construction it will be seen that the shaft K will be held from turning under the pressure of the carriage-actuating spring by the engagement of the pawl O' with either the fixed ratchet L or the loose ratchet L', and that when the pawl is engaged with the loose ratchet the turning of the shaft will be prevented by contact of the stop-pins $l'$ $l^2$ with each other. It will further be obvious that when the pawl is engaged with the loose ratchet L' and the stop-pins on the two ratchets are in contact with each other, if the pawl be swung laterally into engagement with the fixed ratchet, the loose ratchet will be turned or moved forward by the action of the spring M until arrested by contact with one of the shoulders $n$, or by the contact of the pins $l'$ and $l^3$, the extent of angular movement of the loose ratchet under such action of the spring depending upon the position occupied at that moment by the sleeve N. Furthermore, as said shoulders $n$ and stop $l^3$ are separated from each other by angular distances each equal to the length of one of the ratchet-teeth, measured in degrees, it follows that the loose ratchet will be turned to an angular distance of one, two, three or more teeth, according to the distance from the rear end of the slot in the loose ratchet to the shoulder, which is at that moment in position to act as a stop, or, in case the sleeve has been completely withdrawn, according to the distance between the stop-pins $l^2$ and $l^3$. The shoulders $n$ of the stop-flange N' also stand in fixed angular relation to the stop-pin $l'$ on the fixed ratchet, so that when the sleeve N is shifted to bring either of the shoulders $n$ into position to arrest the movement of the ratchet the shifting of the pawl O' from the loose to the fixed ratchet will permit the latter (which has heretofore been held from turning with its stop-pin $l^2$ in contact with the stop-pin $l'$ of the fixed ratchet) to turn, so as to carry its stop-pin $l^2$ away from the stop-pin $l'$ on the fixed ratchet a distance equal to the angular distance of one, two, three, or more teeth, according to the angular distance of the stop, which is then in position to arrest the loose ratchet from the starting-point of the latter, such starting-point being the position at which it stands when released. Consequently when the pawl O' is vibrated or shifted from one ratchet to the other by successive operations of the keys the shaft K will be caused to revolve intermittingly or by a step-by-step movement by the force of the carriage-spring acting through the carriage, and the extent of each movement of the shaft and corresponding movement of the carriage will be determined by the extent to which the loose ratchet has previously been allowed to turn on the shaft under the action of the spring M before having its movement arrested by one of the stop-shoulders $n$ or by the stop-pin $l^3$. The forward movement of the carriage and the attendant rotary movement of the shaft of course takes place immediately after and in consequence of the retraction of the pawl O' from engagement with the fixed ratchet, or, in other words, upon the release of the key which is being operated from pressure. Each time the shaft is thus turned by the carriage-actuating spring the spring M, which turns the loose ratchet, must of course be under its maximum tension, to which end it must be of such proportionate strength that it may be readily overcome by the pressure of the carriage-actuating spring, while sufficiently strong to promptly turn the loose ratchet through the greatest distance the latter may ever be required to be moved.

The mechanism herein shown for shifting the top sleeve N longitudinally of the shaft K when the bars $B^2$ are reciprocated by means of the keys B is constructed as follows: Q is a lever, which is pivotally mounted between its ends upon a horizontal pivot $q$, secured in the machine-frame directly below the shaft K. Said pivot $q$ is in this instance made of the form of a screw-pin supported at its ends in upwardly-projecting lugs $o^5$ of a cross-bar $o^6$, connecting the depending arms $o^2$, between which the pivot-pin $o$ of the lever O is mounted. An integral sleeve $q'$, provided on the lever Q, affords a bearing-surface of considerable length on the pivot-pin $q$, by which the lever Q is securely maintained against deflection from its plane of oscillation. At its upper end the lever Q is forked to embrace the sleeve N and is provided with inwardly-projecting pins $q^2$, which engage an annular groove $n'$ in said sleeve, the construction being such that the sleeve is free to revolve with the shaft K, while adapted to be shifted longitudinally upon the latter when the said lever Q is oscillated. At the lower end of the lever Q an antifriction-roller Q' is rotatively mounted in position to be acted upon by any one of a series of rotative or otherwise movable differentiated cams R R' $R^2$ $R^3$, which are placed side by side and are adapted to be independently rotated, so as to oscillate the lever Q through different distances. As herein shown, said cams are four in number to correspond with the number of stop-shoulders $n$ of the sleeve N, and are mounted on a common pivot-screw or stud $r$ between the lower ends of depending arms or lugs $o^7$, attached to the cross-bar $o^6$.

Oscillatory movement is given to the cams R R' R² R³ by connections between the latter and four transverse rock-shafts S S' S² S³, mounted at their ends in the cleats $a^{16}$ of the side plates A' in the same manner as the rock-shaft P. Rigidly attached to each of the rock-shafts is a depending leaf or blade $s$, the lower edge of which is located in close proximity with the longitudinal bars B². Suitable springs $s'$ are applied to the several rock-shafts in such manner as to normally press the lower edges of the blades rearwardly against the front sides of upwardly-projecting stop-pins $b^{11}$, located on the bars B². Said springs $s'$ are in this instance ordinary coiled tension-springs, secured at their rear ends to upwardly-projecting rigid radial arms $s^2$ of the rock-shafts, and at their forward ends to inwardly-projecting arms $s^3$, secured to the cleats $a^{16}$, within which said rock-shafts are pivotally mounted. In the particular construction illustrated the rearmost rock-shaft S, which is located directly beneath the cams, is connected with the largest cam R by a link $r'$, that is pivotally secured at its upper end to the outer edge of said cam and at its lower end to the end of a rearwardly-projecting rigid radial arm $s^4$ of said rock-shaft S. The outer three rock-shafts S' S² S³ are provided with upwardly-projecting rigid radial arms $s^5$, which are connected by pivotal links $s^6$, $s^7$, and $s^8$ with the lower ends of bell-crank levers S⁴. The latter are pivotally mounted upon a transverse pin $s^9$, which is supported in the machine-framework adjacent to the rear wall A³ thereof at a level slightly above that of the rock-shafts. The upper ends of said bell-crank levers S⁴ project forwardly and are pivotally secured to the lower ends of links $r^2$ $r^3$ $r^4$, which are pivotally attached at their upper ends to the cams R' R² R³, respectively. The pivot-pin $s^9$, upon which the cranks S⁴ are mounted, is in this instance supported between the ends of an upwardly and rearwardly projecting bracket $a^{17}$, which is secured by screws $a^{18}$ to the rear face of a transverse bar A¹². Said bar extends between the side plates A' of the frame near the rear ends thereof, immediately below the bars B², and affords a support for the rear ends of the latter. A plate $a^{19}$, secured to the front face of said bar, is provided on its upper edge with a plurality of projecting points or pins $a^{20}$, which extend between the bars B² and serve to maintain the latter at a uniform distance apart.

Each of the rock-shafts S S' S² S³ is actuated by a limited number of the reciprocatory bars B², and no one of the latter is provided with more than a single stop-pin $b^{11}$, so that the same bar cannot act to oscillate more than one of said rock-shafts, it being understood that the stop-pins $b^{11}$ (shown in Fig. 8) represent the end pins nearest the eye of the several rows of pins which are adapted to act on the several blades $s$, and of which no two pins are attached to the same reciprocatory bar. Obviously when either of the rock-shafts S S' S² S³ is oscillated by a reciprocatory bar B² it will turn or swing the cam which is connected with said rock-shaft through a part of a rotation, thereby moving the lever Q a greater or less distance according to the shape of the cam, and when the key is released the said rock-shaft and its corresponding cam will be restored to their original positions by the tension of the spring $s'$, which is connected with that rock-shaft.

The cams R R' R² R³ are provided with dissimilar cam-surfaces so shaped and proportioned that each cam will move or shift the sleeve G into a different position on the shaft, and thereby bring one or another of the several stop-shoulders $n$ into position for engagement with the loose ratchet L' or withdraw the sleeve altogether from the said ratchet, so as to permit the latter, when released, to rotate until its stop-pin $l^2$ strikes the stop-pin $l^3$ of the fixed ratchet. The cams illustrated are of the kind having peripheral cam-surfaces, and the roller Q' is held in contact with the cams by means of a spring Q², which, in this instance, is an ordinary coiled tension-spring attached at its opposite ends to the lower end of the lever Q and to the lower end of an arm $o^8$, which depends from the cross-bar $o^6$. The spring thus arranged serves to move the sleeve N in one direction, while each of the cams when rotated is adapted to move the same a greater or less distance in the opposite direction and determines its position at that instant with relation to the loose ratchet L'. The cam may be so arranged as to move the sleeve N either toward or from the loose ratchet when the type-keys are depressed, and in either case the sleeve may be arranged to occupy, when unmoved by either cam, a position affording the extent of feed motion required for type or types of a certain width. As, for instance, the sleeve N may stand normally in a position for contact of the loose ratchet with the first stop-shoulder, so as to afford only one unit of movement in the sleeve N when neither of the cams is moved, and the four cams may be arranged to throw the sleeves to points at such unequal distances from the loose ratchet that the same will strike either the second, third, or fourth stop-shoulder or the stop-pin $l^3$, according to the extent of movement produced by that one of the cams which is moved. For this reason it is not necessary that every one of the reciprocatory bars B² should be connected with or give movement to one of the cams; but the several bars which actuate the types of that width of feed produced by the stop-shoulder which stands in position for contact with the loose ratchet when the sleeve N is unmoved need actuate only the rock-shaft P, which serves to oscillate the lever O and permits the shaft K to rotate. Accordingly, in the construction shown in this instance, the stop-pins $b^{11}$, which actuate the rock-shafts S S' $S^2$ $S^3$, are omitted from a portion of the reciprocatory bars $B^2$, but each of said bars is provided with a stop-pin $b^{10}$ for actuating the rock-shaft P. It is desirable, however, when the sleeve is arranged to stand normally with one of its shoulders in position to give an extent of feed movement necessary for one set of types that the minimum extent of movement should be given the sleeve for determining the feed for wider or narrower types. To this end the sleeve N, as herein shown, is arranged to stand normally in position for contact of the loose ratchet with one of the intermediate stop-shoulders, in this instance the second one, and one cam is arranged to advance the sleeve toward the ratchet, so that the latter shall strike the first stop-shoulder, while the other three cams are constructed to retract the sleeve from the loose ratchet, so that said ratchet will be arrested by either the third or fourth stop-shoulder or by the stop-pin $l^3$, as desired. In this way the feed devices are operated with a minimum extent of movement of the parts. The second stop-shoulder is in this instance illustrated as being the one which affords an extent of feed to the greatest number of characters or types as ordinarily constructed. The stop-pin $l^3$ will obviously serve to give the greatest extent of feed which will ordinarily be required by the least number of types, while the intermediate stops will be employed for types requiring intermediate degrees of feed movement. It will of course be understood that the stop-pin $L^3$, which in this instance determines the ultimate extent of movement of the loose ratchet and the maximum feed produced by the striking of any one key, operates in precisely the same manner as would a fifth shoulder on the stop-flange N', and that such shoulder may, if desired, be substituted for said stop-pin without affecting in any way the operation of the feed mechanism or requiring any material alteration in the other parts thereof.

As hereinbefore stated, certain only of the bars $B^2$ actuate the cams R R' $R^2$ $R^3$, and it will of course be understood that all of the rock-shafts which control or actuate types require the same extent of feed to actuate the same cam, so that the number of cams employed in any case will be one less than the number of units of feed movement provided for in the machine, no movement of the sleeve N on the shaft K being required for types of one certain width, as hereinbefore explained. The machine shown in the accompanying drawings affords five units of movement and therefore contains four cams. It follows that in said machine the reciprocatory bars $B^2$ will be divided into five groups, of which one group gives no movement whatever to the sleeve G, while another group actuates the cam $R^3$ and limits the movement of the carriage to a distance equal to one unit of movement, and the third, fourth, and fifth groups actuate the cams R, R', and $R^2$, so as to limit the movement of the carriage to a distance of three, four, or five units of movement.

It will further be understood that the number of stop-shoulders $n$ on the sleeve N and the number of cams for actuating said sleeve may be increased or decreased to provide for a greater or less number of type-groups, and it follows that the machine may be provided with type characters or words of any desired width, it being only necessary to add a stop-shoulder and a cam and actuating device therefore for each additional width of type to be provided for.

In order to enable the carriage to be released from the control of the automatic feed mechanism when it is desired to move the carriage by hand—as is necessary, for instance, in inserting a letter in place of an erased one—I have provided devices as follows: T is a sliding rod, the outer portion $t$ of which is arranged parallel with the rear margin of the top plate of the machine and is adapted to slide endwise within a guide-aperture in the adjacent standard $A^5$. Between its ends said rod is provided with a double bend, so that its inner portion $t'$ is arranged parallel to its outer end $t$ and is brought in position to pass through a guide-aperture provided in a lug $o^9$ on one of the depending arms $o^2$. The inner end of the rod extends in front of the lower end or rigid arm $o^4$ of the pawl O', and its inner extremity $t^2$ is bent rearwardly, so as to normally stand between said arm and the lever O without interfering with the oscillatory movement of the latter. A rearwardly-projecting finger-piece $t^3$, arranged to slide within a bracket-arm $a^{21}$ of the top plate $A^4$, enables the rod to be conveniently manipulated, and a spring T', applied to the rod T between the finger-piece and the standard $A^5$, normally holds the inner extremity $t^2$ in position to allow the pawl O' to remain in engagement with the ratchet. By pressing the carriage slightly to the right and moving the rod longitudinally in its guides in opposition to the spring T' its extremity $t^2$ will be moved in a direction to throw or turn the pawl O', so as to move it out of engagement with the ratchets, whereupon the latter will be free to rotate, and the carriage E may be moved by hand to the desired point.

It will be noted that the part which is herein termed the "pawl" O' does not in the usual operation of the feeding devices perform the function of a pawl, as the term is commonly understood; but in connection with the arm O, of which it is, in fact, a part, said pawl O' acts as a dog or detent to control the advance movement of the ratchets, it being obvious that the said part O' acts in the manner of a pawl only when the ratchets are turned backwardly in the backward movement of the carriage, the said pawl O' at such time swinging on the pivot by which it is connected with the arm O. In case therefore devices are provided for enabling the carriage to be moved backward to its starting-point without the turning of the shaft K the pawl need not be pivoted and will form merely the extremity of the arm O. In view of these facts I do not desire to be limited to the use of a pawl as a means by which the movements of the ratchets are controlled.

In Fig. 22 I have shown a slightly different construction, in which the spring $O^3$ is made adjustable. In said figure the spring is secured at one end to a collar $o^{10}$, which is adjustably clamped on the pivot-shaft $o$ by means of a set-screw $o^{11}$. The other end of the spring $O^3$ is bent to form a loop $o^{12}$, which is screwed to engage an adjusting-screw $o^{13}$. The latter bears at its point upon the face of the adjacent hanger-arm $o^2$, so that by turning the screw $o^{13}$ the springs may be placed under greater or less tension, as desired. A still further adjustment may also obviously be obtained by turning the collar $o^{10}$ on the shaft and securing it in its changed position by means of its set-screw $o^{11}$.

I claim as my invention—

1. In a type-writer, the combination with vertically-movable keys and pivoted type-carrying bars, of connections between the same comprising longitudinally-arranged endwise-reciprocating bars, bell-crank levers beneath the keys, said bell-crank levers having horizontal arms with which the keys are connected and vertical arms which are attached to the said longitudinal bars, other bell-crank levers located beneath the type-carrying bars, the same being provided with vertical arms which are connected with said longitudinal bars and horizontal arms by which motion is transmitted to the type-carrying bars and links which connect the said horizontal arms of the last-named bell-crank levers with the type-carrying bars, substantially as described.

2. In a type-writer, the combination with vertically-movable keys and pivoted type-carrying bars, of connections between the same comprising longitudinally-arranged endwise-reciprocating bars, bell-crank levers beneath the keys, said bell-crank levers having horizontal arms with which the keys are connected and vertical arms which are attached to the said longitudinal bars, other bell-crank levers located beneath the type-carrying bars, the same being provided with vertical arms which are connected with said longitudinal bars and horizontal arms by which motion is transmitted to the type-carrying bars, links which connect the said horizontal arms of the last-mentioned bell-crank levers with the type-carrying bars, and springs connected with the frame and with the said bars and acting to move the said bars longitudinally in a direction to normally maintain the type in a retracted position, substantially as described.

3. In a type-writer, the combination with the type-keys and pivoted type-carrying bars, of a plurality of transverse horizontal rods, bell-cranks pivotally mounted on said rods and attached at one end to the key-stems, reciprocatory longitudinal bars attached to the other ends of said levers, a plurality of transverse rods arranged beneath the type-carrying bars, bell-crank levers pivotally mounted on the latter rods and attached at their lower ends to the reciprocatory bars, links pivotally connecting the other ends of the latter levers with the type-carrying bars, transverse rods arranged adjacent to the reciprocatory bars, and tension-springs attached at opposite ends to the latter rods and to the longitudinal bars, substantially as described.

4. In a type-writer, the combination with the keys and with type-carrying bars rigidly mounted in circular succession, of depending links pivotally attached to said bars, transverse rods arranged horizontally beneath the bars and links, bell-crank levers pivotally mounted on said rods in groups and pivotally attached to the superjacent links, said links being adapted to normally stand with their body portions vertical and having their lower ends bent to engage said levers, reciprocatory longitudinal bars pivotally attached to the opposite ends of said levers, and other bell-crank levers connecting the reciprocatory bars with the key-stems, substantially as described.

5. A type-writer having a horizontal basket-ring supported on its frame, vertical flanges depending from said ring and arranged at angles to radial lines of the ring, type-carrying bars provided with pintles which are mounted in groups between said flanges, each of said flanges affording bearings for the adjacent ends of the pintles of two adjacent groups, the pintles in each group being arranged in different horizontal planes and at different angles relatively to the plates on which they are mounted and the type-bars being bent so as to bring their free ends to the center of the basket when they are raised, substantially as described.

6. A type-writer provided with a horizontal basket-ring in its frame, vertical flanges depending from said ring and arranged at an angle with radial lines of the ring, type-bars provided with pintles and mounted in groups between two adjacent flanges, each flange forming bearings for the adjacent ends of the pintles of two adjacent groups and the several pintles of each group being arranged in different horizontal planes, and at different angles relatively to the flanges on which they are mounted, said pintles consisting of radially-attached pins engaging at their ends with pivot-screws inserted through said flanges, the pivot-screws at one end of the pintles in each group being arranged in a vertical row, near the outer edge of the vertical flange in which they are inserted, and the pivot-screws at the opposite ends of the pintles in the group being arranged in an inclined row with the lower screw adjacent to the inner end of the flange in which they are supported and the upper screw nearer the outer edge of said flange, substantially as described.

7. In a type-writer, the combination with a main frame provided on its top with parallel transverse ways, of a reciprocatory transverse carriage comprising end frames and transverse bars connecting said end frames and provided with antifriction-rollers engaging said ways, and a vertically-adjustable bearing-strip secured to one of said ways and provided with a guiding-rib engaging a corresponding groove in the adjacent bar, whereby the alinement of the carriage is correctly maintained, substantially as described.

8. In a type-writer, the combination with the main frame of a carriage mounted to slide upon said frame, bearing-slots in the upper edges of the end frames of the carriage, open-ended curved slots in said end frames arranged concentrically with the bearing-slots, a cylindric platen the shaft of which is adapted to enter said curved slots, side pieces pivotally mounted on the platen-shaft, and a transverse rod rigidly connecting the upper ends of said side pieces and projecting beyond the same to normally rest within the bearing-slots when the platen-shaft is in engagement with the curved slots, substantially as described.

9. The combination with the reciprocating carriage of a type-writer, the end frames of said carriage being provided in their upper edges with bearing-slots and with open-ended curved slots formed concentric with the bearing-slots, of a cylindric platen the shaft of which is adapted to enter the curved slots, side pieces pivotally mounted on the platen-shaft, pivots projecting from the upper ends of said side pieces and adapted to rest in the bearing-slots when the platen-shaft is engaged with the curved slots, and a holding device or detent on the side frame of the carriage adapted to engage the platen-shaft so as to normally maintain the same at the inner end of the curved slot, substantially as described.

10. In a type-writer, the combination with the reciprocatory carriage having bearing-slots in the upper edges of its end frames and open-ended curved slots concentric with the bearing-slots, of a cylindric platen the shaft of which is adapted to enter the curved slots, side pieces pivotally mounted on said platen-shaft and provided at their upper ends with pivots adapted to rest in the bearing-slots when the platen-shaft is in engagement with the curved slots, and a detent mounted on the side frame of the carriage and adapted to normally engage and sustain the platen-shaft when the latter is lifted to the upper end of the curved slots, substantially as described.

11. In a type-writer, the combination with the reciprocatory carriage having bearing-slots in the upper edges of its end frames and open-ended curved slots, of a cylindric platen the shaft of which is adapted to enter the curved slots, side pieces pivotally mounted on said platen-shaft and provided with pivots adapted to rest in the bearing-slots when the platen-shaft is in engagement with the curved slots, and detents mounted on the side frame of the carriage and adapted to hold the platen in its elevated and depressed position, and connections between said detents whereby motion is transmitted from one to the other, substantially as described.

12. In a type-writer, the combination with the sliding carriage, bearing-slots in the upper edges of the end frames of the carriage, open-ended curved slots in said frames formed concentric with the inner ends of the bearing-slots, of a cylindric platen, a platen-frame comprising side pieces connected by longitudinal rods and journaled on the platen-shaft, paper-guides pivotally mounted on the rear cross-rod, and pivots projecting from the upper ends of the end pieces and adapted to engage said bearing-slots when the platen-shaft is in engagement with the curved slots, substantially as described.

13. In a type-writer, the combination with the reciprocatory carriage, of a cylindric platen detachably mounted in said carriage, and a platen-frame comprising side pieces connected by longitudinal rods and journaled on the platen-shaft, a paper-guiding plate pivotally mounted on the rear cross-rods, a guide-roller journaled at the lower end of said guide-plate, a guide-strip beneath said roller with its front edge in proximity to the surface of the platen, forwardly-projecting spring-strips secured at the ends of said guide-strip and curved to conform to the curved surface of the platen, and springs applied to the guide-plate and serving to normally maintain the guide-roller in contact with the platen, substantially as described.

14. In a type-writer the combination with a reciprocating paper-carriage, of a cylindric platen removably journaled on said carriage and provided at its end with a ratchet-flange, an endwise-reciprocatory bar mounted on the carriage adjacent to said ratchet-flange and provided with a pawl, yieldingly engaging said flange and a lever pivoted to the front of the carriage and extending outwardly therefrom in a direction at right angles to the path of the carriage, said lever being connected with the reciprocatory bar by means of a link which is pivoted to the lever at a point at one side of its pivotal axis whereby sidewise pressure on the lever for actuating the carriage will move the said reciprocatory bar and turn the platen, substantially as described.

15. In a type-writer the combination with a reciprocating carriage, of a cylindric platen journaled in the carriage and provided with a ratchet-flange and a reciprocating bar mounted on the carriage adjacent to the ratchet-flange and provided with a pawl which yieldingly engages said flange, a lever pivoted to the front of the carriage and projecting outwardly from the same in a direction at right angles with the path of the carriage, a link connecting the said lever with said bar said link being pivoted to the lever at a point at one side of the pivotal axis of the same and means for variably limiting the throw of the bar, comprising a rotary sleeve located on the carriage adjacent to the free end of the lever and provided with stops against one or the other of which the lever is adapted to strike, according to the position of the sleeve, substantially as described.

16. In a type-writer, the combination with the sliding carriage, the end frames of which are provided in their upper edges with bearing-slots, and open-ended curved slots arranged concentrically with the inner ends of the bearing-slots, of a cylindric platen the shaft of which is adapted to enter the curved slots, side pieces pivotally mounted on the platen-shaft, pivots projecting from the upper ends of said side pieces and adapted to rest in the bearing-slots when the platen-shaft is in engagement with the curved slots, a ratchet-flange on the end of the platen, a reciprocating bar arranged upon the carriage parallel with the ratchet-flange and in proximity thereto, a pawl on said bar yieldingly engaging said flange, a lever pivoted to the carriage and connected with the reciprocatory bar whereby the latter may be actuated to give intermittent rotary motion to the platen, and a spring attached to one of the side pieces and yieldingly engaging the ratchet-flange to normally hold the platen from rotation, substantially as described.

17. An inking mechanism for type-writers, comprising spools or drums mounted upon parallel shafts at opposite sides of the machine-frame and provided with annular grooves at their ends, a transverse rod rigidly mounted in the machine-frame and provided at its ends with rigidly-attached lever-arms the upper ends of which engage said annular grooves in said spools, a cord or strand attached to the carriage-actuating drum and to one of said lever-arms whereby said arms are actuated by the movement of the carriage in one direction, and a spring for moving said arms in the opposite direction, substantially as described.

18. In a type-writer, the combination with the traveling carriage and its actuating spring-drum, of an inking mechanism comprising ribbon spools or drums mounted on parallel shafts at opposite sides of the machine-frame and adapted for movement longitudinally thereof, said spools being provided with annular grooves a transverse rod which is mounted in the machine-frame and provided at its ends with upwardly-extending rigidly-attached lever-arms the upper ends of which engage said annular grooves in said spools, a cord or flexible strand secured at one end of the drum and at its other end to one of said levers, a spring applied to said lever-arms to oppose the tension of the flexible strand, ratchet-teeth on the ends of the drums, and pivoted pawls adapted to engage said ratchet-teeth at the end of the reciprocatory movement of the drums, substantially as described.

19. In a type-writer the combination with endwise-reciprocatory bars which communicate motion from the keys to the type and a variable spacing device for the paper-carriage, comprising a movable part having stops or graduating stop-shoulders either of which may be brought into position to determine the extent of the forward movement of the carriage, of means for actuating said movable part from the several endwise-movable bars, comprising a plurality of rock-shafts extending across the frame of the machine and located in the same horizontal plane above the said bars, said rock-shafts being provided with depending wings or flanges and upwardly-extending crank-arms and the bars being arranged in a horizontal plane and provided with projections adapted to engage the wings of said rock-shafts and bell-crank levers provided with depending arms which are connected by links with the crank-arms of the rock-shafts and with horizontal arms which are connected with and give motion to said movable part, substantially as described.

20. In a type-writer the combination with vertically-movable keys and pivoted type-carrying bars, a paper-carriage, actuating devices for the paper-carriage and a variable spacing device, comprising a movable part having steps or graduating stop-shoulders, of connections between the keys and type-carrying bars consisting of endwise-reciprocating bars, bell-crank levers beneath the keys, having horizontal arms with which the keys are connected and vertical arms which are attached to the longitudinal bars, other bell-crank levers located beneath the type-carrying bars and provided with vertical arms which are connected with the longitudinal bars and horizontal arms which are connected with the type-carrying bars and operative connections between said bars and the variable spacing device, comprising a plurality of rock-shafts extending transversely above the said bars and provided with depending wings or flanges, said bars being arranged in the same horizontal plane and provided with projections located in position to engage the wings on the bar or bars and operative connections between said rock-shafts and the said movable part having steps or graduating stop-shoulders, substantially as described.

21. As a means for controlling the feed motion of a type-writing machine of that class in which endwise-reciprocatory bars are employed to transmit motion from the keys to the types, operative connections between the bars and the paper-carriage, embracing a movable part having steps or graduating stop-shoulders, adapted to limit the movement of the paper-carriage, cams applied to actuate said movable part, said cams being provided with two concentric surfaces of unequal radii, rock-shafts extending transversely of the endwise-movable bars, said rock-shafts being located above the bars and being provided with depending wings or flanges and with upwardly-extending arms, said bars being arranged in the same horizontal plane and provided with projections adapted to engage said wings or flanges and bell-crank levers having depending arms which are connected with the arms on the rock-shafts and horizontal arms which are connected with and actuate said cams, substantially as described.

22. As a means for controlling the feed motion of a type-writing machine, in which motion is transmitted from the keys to the type through the medium of endwise-reciprocatory bars, a ratchet movable with the paper-carriage, a second ratchet movable relatively to the first ratchet, a spring adapted to advance the second ratchet relatively to the first one, a laterally-movable detent adapted to engage either ratchet, a movable part having steps or graduating stop-shoulders which limit the movement of the carriage, cams applied to actuate said movable part, rock-shafts extending transversely above the reciprocatory bars, said rock-shafts being provided with depending wings or flanges and the said bars being arranged in the same horizontal plane and provided with projections adapted to engage said wings or flanges, each of said rock-shafts being adapted for actuation by one or more of said bars, operative connections between the said rock-shafts and the cams, embracing bell-crank levers, a separate rock-shaft also located transversely above said bars, said rock-shaft also having a depending wing or flange, all of the bars being provided with projections engaging said wing or flange of the last-named rock-shaft, and a pivoted lever, the upper end of which carries said detent, and the lower end of which is connected with an upwardly-extending arm on said last-named rock-shaft, substantially as described.

In testimony that I claim the foregoing as my invention I affix my signature in presence of two witnesses.

CHARLES S. ELLIS.

Witnesses:
C. CLARENCE POOLE,
WM. S. HALL.